Figure 1:
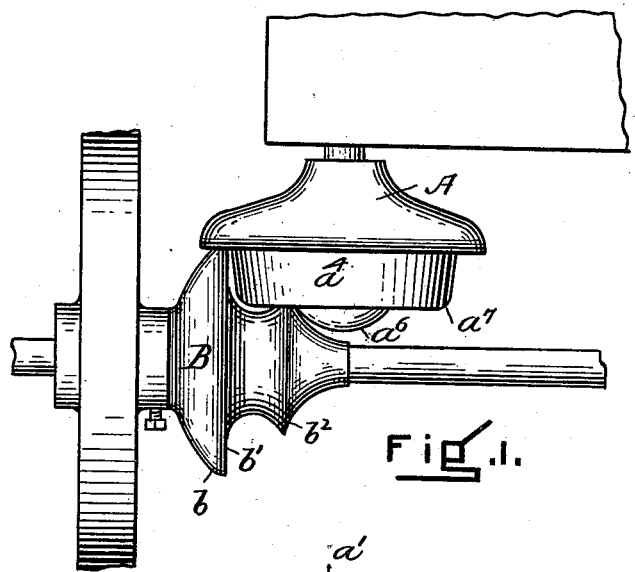

(No Model.)

J. C. LAFRENIÈRE.
ANTIFRICTION BEARING.

No. 512,477. Patented Jan. 9, 1894.

WITNESSES
J. M. Dolan.
J. W. Cummings.

INVENTOR
Joseph C. Lafrenière
by his Attys
Clarke & Raymond

UNITED STATES PATENT OFFICE.

JOSEPH C. LAFRENIÈRE, OF BOSTON, MASSACHUSETTS.

ANTIFRICTION-BEARING.

SPECIFICATION forming part of Letters Patent No. 512,477, dated January 9, 1894.

Application filed August 2, 1893. Serial No. 482,167. (No model.)

*To all whom it may concern:*

Be it known that I, JOSEPH C. LAFRENIÈRE, a citizen of the United States, residing at Boston, in the county of Suffolk and State of Massachusetts, have invented a new and useful Improvement in Antifriction-Bearings for Axles, Shafts, Wheels, &c., of which the following is a full, clear, and exact description, reference being had to the accompanying drawings, forming a part of this specification, in explaining its nature.

The invention relates to an anti-friction bearing composed of a rotating pivoted disk of peculiar shape, which acts as an anti-friction roll and support or brace for a companion disk or roll, which is supported by the wheel, axle, or shaft, and which has surfaces of peculiar shape which bear against the first named anti-friction roll.

In the drawings the invention is represented as applied to the wheels of a vehicle.

Figure 2:
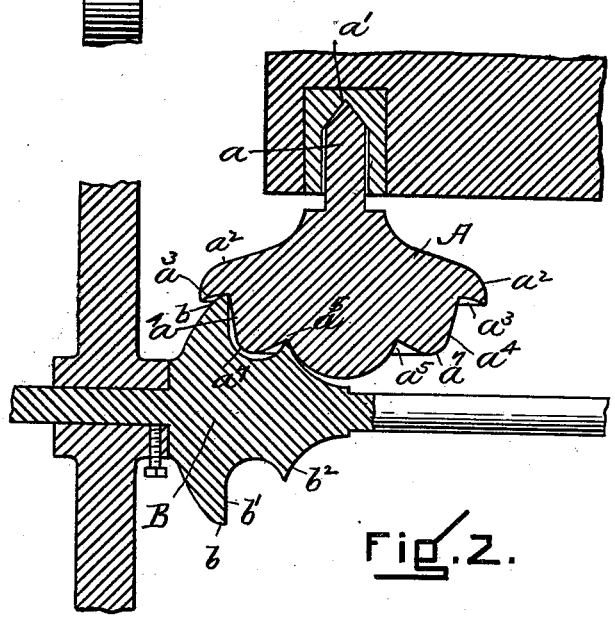

Figure 1 is a view in elevation, and Fig. 2 in vertical section of my improved device.

In the drawings A represents the upper or pivoted anti-friction roll, and B the one which is affixed to the wheel, axle, or shaft, and which bears against the roll A. The roll A has extending from its center the pivot $a$ ending preferably in a conical point, which rests against a shoe or cup $a'$. The disk or roll A has the flange $a^2$, the under surface $a^3$ of which forms a circular track, against which the periphery $b$ of the roll B bears. Within this circular track there is a downward extending section $a^4$ of a conical shape, against which the face $b'$ of the lower roll bears; and the roll or disk A also has the recess $a^5$ formed in the under surface of the central section, between the knob or rounded center $a^6$ and the edge $a^7$. This rounded track receives section $b^2$ of the disk B, which is shaped as represented in Fig. 1 and is of a form to fit in to the recess and bear against the upper edge of the rounded section $a^6$.

I have found that an anti-friction bearing of this description is very substantial and acts as a firm support for the wheel, axle or shaft and reduces friction to the minimum. It can be employed on wheels, axles or shafts or wherever it is desired to reduce the friction of the rotating device.

Having thus fully described my invention, I claim and desire to secure by Letters Patent of the United States—

1. The anti-friction bearing herein described, the same comprising the horizontal roll or disk A having an upwardly extending pivot $a$ which furnishes the only bearing therefor, and having upon its under surface the track $a^3$, at one level, and the track $a^5$ at another level, with the roll or disk B having the bearings or tracks $b$, $b^2$ at varying distances from the center of the roll and engaging the tracks $a^3$, $a^5$ of the roll or disk A, substantially as and for the purposes described.

2. In an anti-friction bearing of the character specified, the anti-friction roll or disk A having as its only bearing a pivot $a$, and provided with the tracks $a^3$, $a^5$, at varying heights, and the conical surface $a^4$, between them, and the roll or disk B having the bearing surfaces $b$, $b^2$, at varying distances from the center of the roll and engaging respectively the tracks $a^3$, $a^5$, of the roll A, the said roll B also having the bearing surface $b'$ which engages the surface $a^4$ of the said roll A, as and for the purposes described.

JOSEPH C. LAFRENIÈRE.

Witnesses:
F. F. RAYMOND, 2d,
J. M. DOLAN.